United States Patent

Evans et al.

[15] 3,651,958

[45] Mar. 28, 1972

[54] AUTOMATIC LOADING AND TRANSFER EQUIPMENT

[72] Inventors: Dewey M. Evans, Farmington; Peter J. Manetta, Warren, both of Mich.

[73] Assignee: Simplex Corporation, Detroit, Mich.

[22] Filed: Sept. 25, 1969

[21] Appl. No.: 861,057

[52] U.S. Cl. ................................ 214/1 BB, 82/2.5, 82/2.7, 294/115
[51] Int. Cl. ........................................................... B23b 15/00
[58] Field of Search ................... 214/1 CM, 1 B, 1 BB, 147 T, 214/147 R; 294/115; 82/2.5, 2.7

[56] References Cited

UNITED STATES PATENTS 3,243,980   4/1968   Sehn ................................. 214/147 T
2,714,324   8/1955   Dinsmore ......................... 214/1 BZ X
2,807,373   9/1957   Couser ............................. 214/1 CM UX
2,927,703   3/1960   Rainey ............................. 214/1 BZ
3,261,479   7/1966   Baker ............................... 214/1 CM

FOREIGN PATENTS OR APPLICATIONS 350,483   1/1961   Switzerland ....................... 214/1 CM

*Primary Examiner*—Gerald M. Forlenza
*Assistant Examiner*—George F. Abraham
*Attorney*—Whittemore, Hulbert & Belknap

[57] ABSTRACT

A transfer carriage movable between a station and a machine tool having a pair of work carriers movable independently along intersecting paths operable to pick up a work piece and to deposit in its place another work piece, both at the station and at the machine tool.

2 Claims, 8 Drawing Figures

PATENTED MAR 28 1972 3,651,958
SHEET 1 OF 3
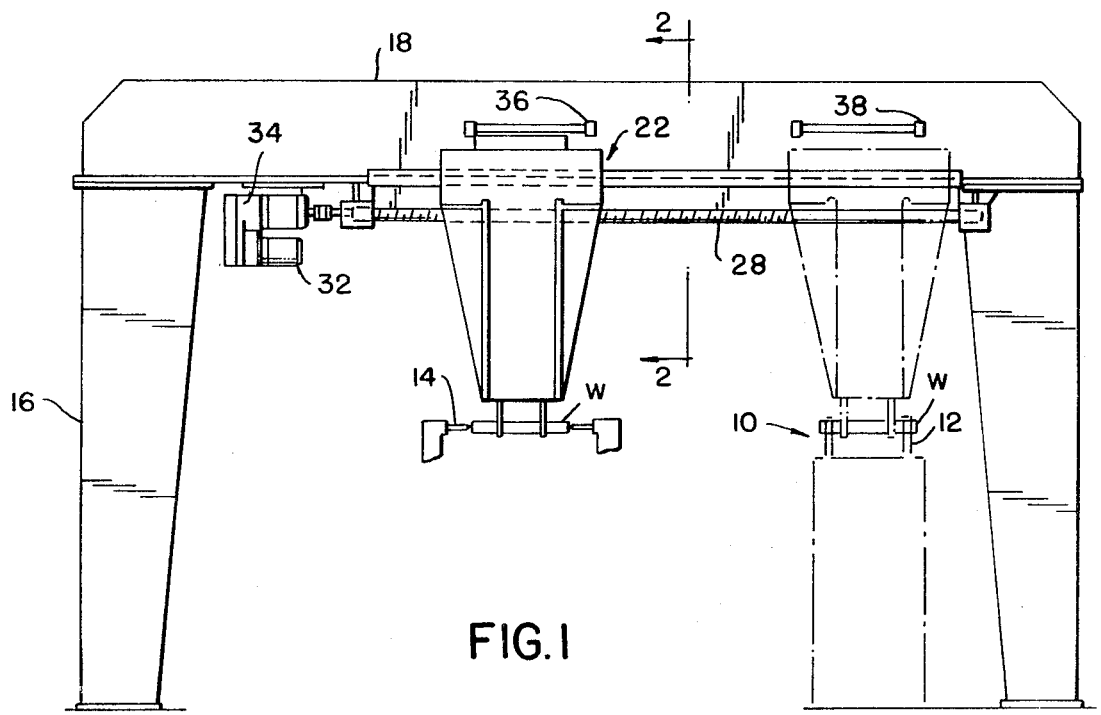
FIG.1
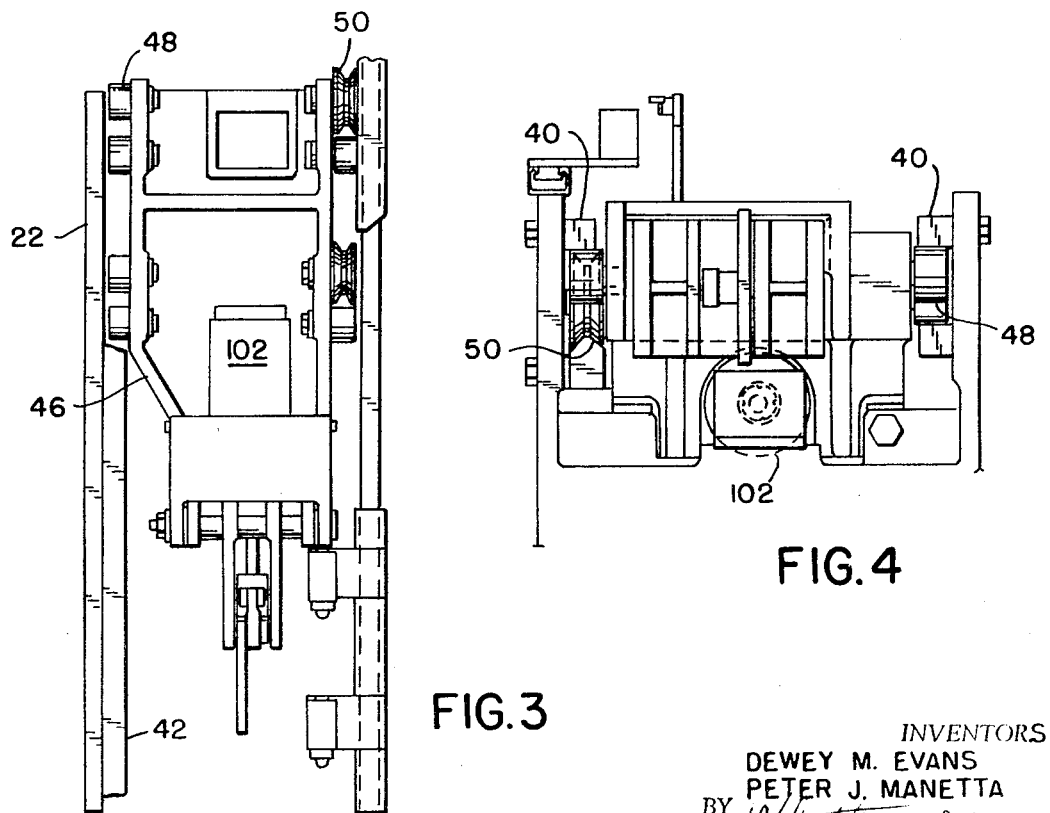
FIG.3
FIG.4
INVENTORS
DEWEY M. EVANS
PETER J. MANETTA
BY Whittemore,
Hulbert & Belknap
ATTORNEYS

INVENTORS
DEWEY M. EVANS
PETER J. MANETTA
ATTORNEYS

INVENTORS
DEWEY M. EVANS
PETER J. MANETTA
BY Whittemore
Hulbert & Belknap
ATTORNEYS 3,651,958

AUTOMATIC LOADING AND TRANSFER EQUIPMENT

BRIEF SUMMARY OF THE INVENTION

The present invention is associated with a transfer line of a multiplicity of stations along which work pieces are advanced intermittently from station to station. Adjacent one of the stations is a machine tool and the transfer equipment transfers work pieces from the station to the machine tool and at the same time transfers a finished work piece from the machine tool to the station.

In order that the work pieces may be picked up and deposited at identical positions, the work carriers are mounted on a carriage for independent movement along intersecting paths. In the particular embodiment of the invention illustrated herein the work carriers are in the form of pairs of jaws.

The carriage is movable on a track overlying both the station and the machine tool and the carriage is movable along the track, in the present instance, by means of a ball nut and screw device. Similarly, the individual slides on the carriage are actuated by independently operable ball nut and screw devices, each of which has its own actuating motor. Finally, the work carrier, and in particular the pairs of jaws disclosed herein, is actuated in jaw opening and jaw closing movement by ball nut and screw devices each of which is equipped with its own motor.

BRIEF DESCRIPTION OF THE DRAWINGS

FIG. 1 is an elevational view of the transfer equipment.

FIG. 3 is a fragmentary elevational view looking in the direction of the arrow 3, FIG. 2.

FIG. 4 is a fragmentary view looking in the direction of the arrow 4, FIG. 2.

DETAILED DESCRIPTION

The automatic loading and transfer equipment disclosed herein is intended to transfer a succession of work pieces W from a station indicated at 10 in FIG. 1, which station is one of a sequence of stations along a line. At the station 10 the work piece W is supported in an exactly located position by a pair of stationary supports 12.

The work pieces W are successively removed from the station 10 and transferred to a machine tool, only the work supporting elements 14 of which are illustrated in FIG. 1. It will be observed however, that the work supporting mechanism is adapted to support each work piece in the machine tool in an exactly predetermined position.

It is accordingly a requirement of the transfer and loading mechanism disclosed herein that it shall be capable of picking up and depositing work pieces in identical positions at the station 10 and at the machine tool having the work locating and supporting elements 14.

Figure 2:
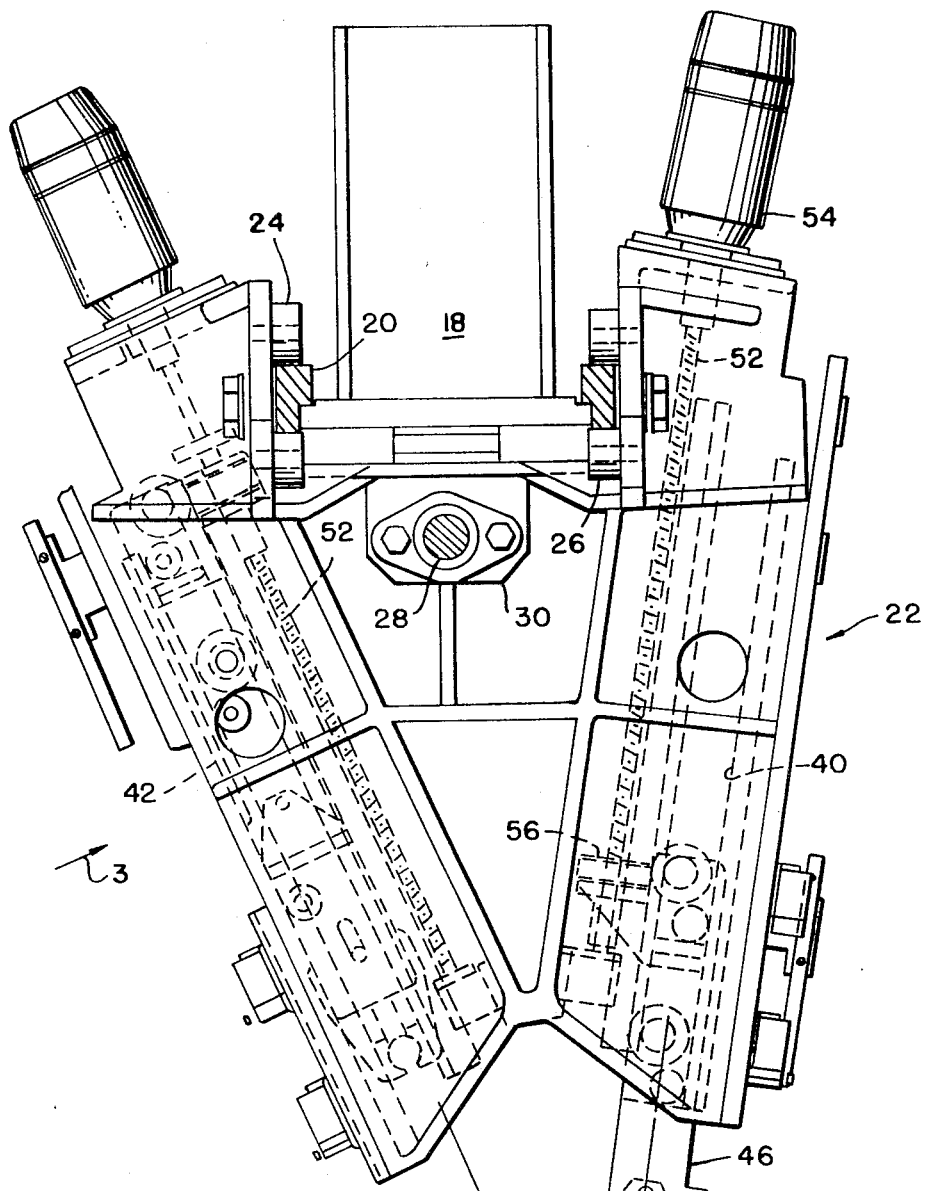
FIG. 2 is an enlarged elevational view, partly in section, on the line 2—2, FIG. 1.

The transfer and loading equipment comprises a main frame made up of columns 16 and an elongated rigid horizontal support 18 which overlies both the station 10 and the machine tool. Mounted on tracks 20 carried by the support 18 is a carriage 22. As best seen in FIG. 2 the carriage is provided with supporting rollers 24 which ride along the upper surface of the tracks 20, and guide rollers 26 which engage the underside of the tracks 20. In order to effect horizontal movement of the carriage 22 from the position directly above the station 10 to the position directly above the machine tool, there is provided a ball nut and screw device comprising a screw shaft 28 and a ball nut 30 mounted on the carriage 22. The shaft 28 is driven in rotation from a motor 32 through a transmission housing 34 and operation of the motor is controlled by switch means indicated generally at 36 and 38 to determine rotation of the screw 28 and hence, travel of the carriage 22 when it is in exactly predetermined position above the line station 10 and the machine tool.

Referring now more particularly to FIG. 2 it will be observed that the carriage 22 includes elongated tracks 40 and 42, the tracks being inclined and having a point of intersection indicated at 44 in FIG. 2, which as illustrated is at the centerline of the work piece W.

On the tracks 40 and 42 are mounted slides 46 each of which is provided with cylindrical rollers 48 and grooved rollers 50 for coaction with the elongated tracks. Extending in parallelism to the tracks 40 and 42 are elongated screws 52 each of which is connected to its own motor 54, the screws having ball nuts 56 associated therewith. The ball nuts are fixedly mounted on the slides 46 and as will be evident, rotation of the screw shafts 52 results in movement of the slides 46 longitudinally of the carriage 22 along their respective trackways 40 and 42.

Adjacent the lower end of each of the slides 46 is a head 58 which is pivoted to the slide as indicated at 60 and which is angularly adjustable about the pivot 60 by adjustable abutment means. This adjustable abutment means comprises a shaft 62 supported for rotation in the slide 46 and having an eccentric portion 64 engaged in slot 66 in the head 58. The shaft 62 is provided with a flat as indicated at 68 for rotation by a conventional tool and is locked in adjusted position by a locking nut 70. This construction provides for exact positioning of the work supporting elements as will subsequently be described.

Figure 8:
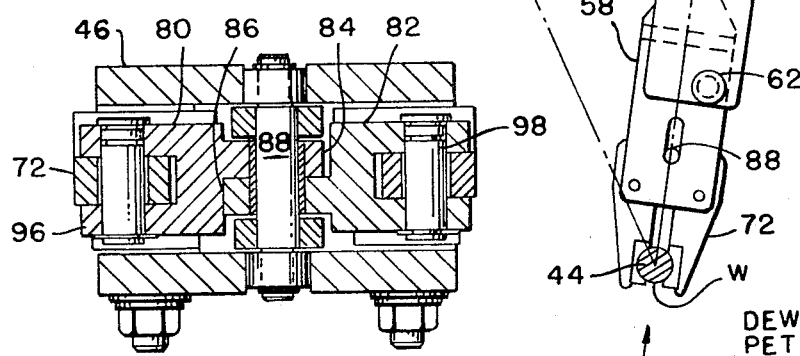
FIG. 8 is a fragmentary sectional view on the line 8—8, FIG. 5.
Figure 6:
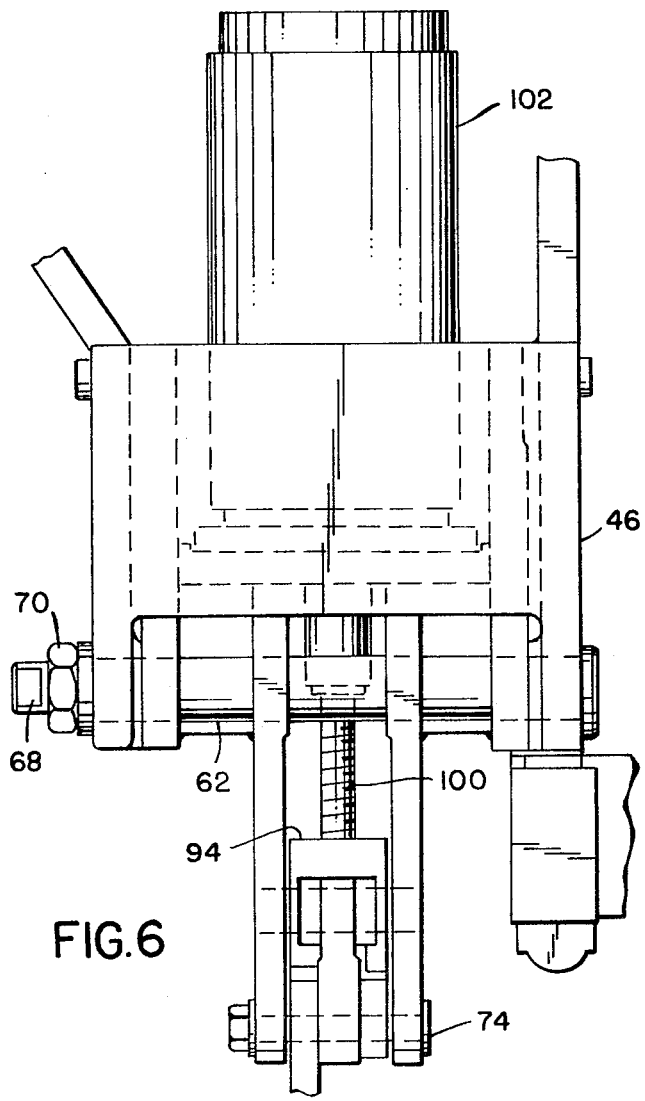
FIG. 6 is a side elevational view of the slide illustrated in FIG. 5.
Figure 7:
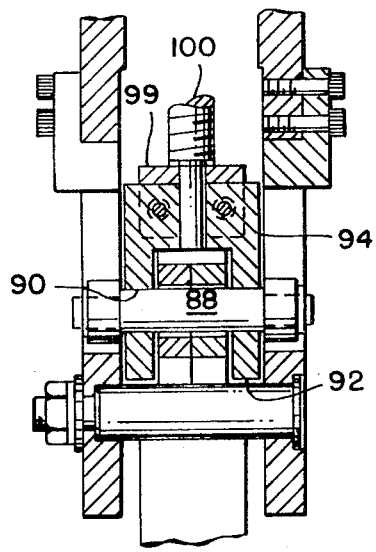
FIG. 7 is a fragmentary sectional view on the line 7—7, FIG. 5.

The head 58 carries work supporting elements which in the present instance are in the form of a pair of jaws 72 which are pivoted intermediate their ends as indicated at 74 and are provided at their lower free ends with work gripping elements 76 suitably received in recesses 78 formed in the confronting faces of the jaw elements 72. Interconnecting the upper ends of the jaw elements 72 is a toggle mechanism comprising links 80 and 82. As best illustrated in FIGS. 7 and 8, the links 80 and 82 include offset portions 84 and 86 respectively which are pivotally interconnected by a pivot pin 88, the ends of which extend through openings 90 provided in arms 92 of a connecting fixture 94. Links 80 and 82 are bifurcated at their outer ends and receive between the bifurcations 96 the upper ends of the jaws 72, the connection being made by pivot pins 98.

The connecting fixture 94 is connected to a ball nut 99 movable on the screw shaft 100 as the shaft is rotated by its own motor 102.

Figure 5:
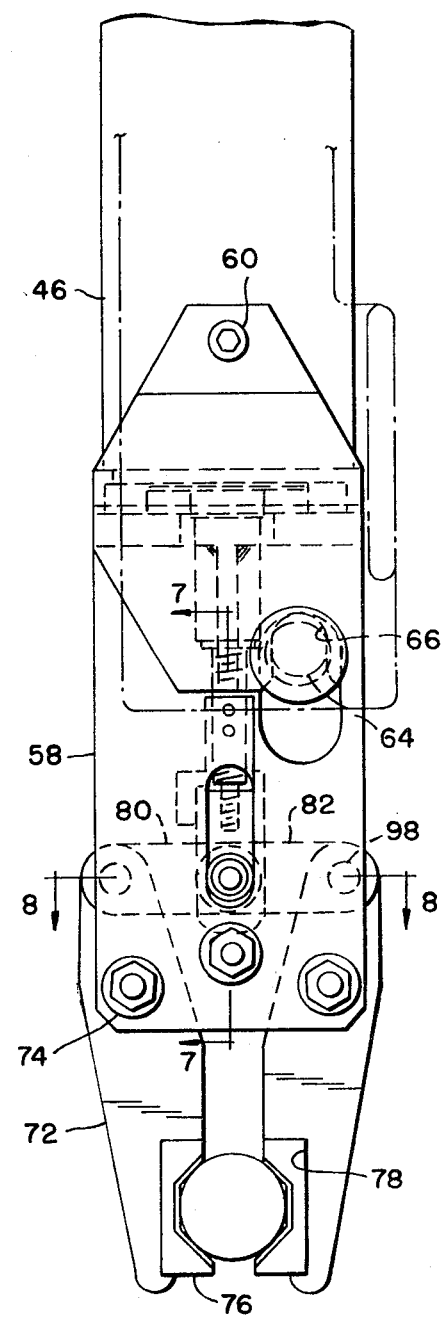
FIG. 5 is an enlarged elevational view of a work supporting slide.

As best seen in FIG. 5, the links 80 and 82 are parallel, thus providing maximum separation between the pivot pins 98 and hence, the closest approach between the jaw elements 76. When the shaft 100 is rotated so as to effect vertical movement of the ball nut, the upper ends of the jaws 72 are drawn together, thus causing the lower ends to separate.

From the foregoing it will be observed that the carriage 22 is shifted horizontally between the positions in which it overlies the work station 10 and the machine tool having the work locating elements 14. Assuming that an unfinished work piece W occupies the work locating fixture 12 at the station 10 and that a work piece W is in the machine tool and has just been finished, the carriage 22 may be in position over the machine tool and an unfinished work piece is gripped in the jaws carried by one of the slides 40 or 42, the jaws of the other slide being empty. At this time the slide carrying the empty jaws is moved downwardly with the jaws in open position and at the lower limit of its movement the jaws are closed to grip a work piece. The slide is then moved upwardly into clearance and the other slide, whose jaws contain the unfinished work piece, is moved downwardly until the work piece occupies precisely the position occupied by the finished work piece before its movement. The work piece is then engaged by locating and supporting structure on the machine tool, such for example as the centers 14, the jaws of the slide are released and the empty slide retracted upwardly. Upon completion of upward movement, or as soon as the parts have cleared the work piece, the carriage 22 is traversed by rotation of the screw shaft 28 to the position overlying the work station 10. At this time the slide provided with the empty jaws is moved downwardly and the jaws actuated to pick up the unfinished work piece now located at the station 10. As soon as the work piece has cleared, the other slide may be moved downwardly bringing the finished work piece into position on the supports 12 and the jaws released and the slide returned upwardly.

It will be appreciated that intermediate cycles of the transfer mechanism disclosed herein, the work pieces are advanced step by step along the stations of the line so that the finished work piece is removed from the station 10 and an unfinished work piece replaces it. At this time the appropriate slide of the carriage 22 is moved downwardly and the unfinished work piece picked up preparatory to transferring it to the machine tool.

What we claim as our invention is:

1. Apparatus for transferring a work piece from a station of a line along which work pieces are advanced intermittently to a machine tool, and for transferring a finished work piece from the machine tool back to the station, comprising: an elongated track extending over the station and machine tool, a carriage movable on said track, means for moving said carriage on said track, a pair of slides movably mounted on said carriage along inclined intersecting paths, a head pivotally connected to each of said slides, work piece support means on each of said heads, said work support means each comprising a pair of work gripping jaws, means for actuating one of said slides and the work piece support means associated therewith to pick up an unfinished work piece at the station and to deposit it at the machine tool, means for actuating the other slide and the work piece support means associated therewith to pick up a finished work piece at the machine tool and to deposit it at the station, said work piece support means of both of said slides being arranged to support and to release portions of the work pieces in identical position both at the machine tool and at the station, and adjustable abutment means operatively connected between each of said slides and the head pivotally connected thereto, said adjustable abutment means comprising rotatable eccentric members and fixed abutment members carried by said slides and heads.

2. Apparatus for transferring a work piece from a station of a line along which work pieces are advanced intermittently to a machine tool, and for transferring a finished work piece from the machine tool back to the station, comprising: an elongated track extending over the station and machine tool, a carriage movable on said track, means for moving said carriage on said track, a pair of slides movably mounted on said carriage along inclined intersecting paths, a head pivotally connected to each of said slides, work piece support means on each of said heads, said work support means each comprising a pair of work gripping jaws, means for actuating one of said slides and the work piece support means associated therewith to pick up an unfinished work piece at the station and to deposit it at the machine tool, means for actuating the other slide and the work piece support means associated therewith to pick up a finished work piece at the machine tool and to deposit it at the station, said work support means of both of said slides being arranged to support and to release portions of the work pieces in identical position both at the machine tool and at the station, and adjustable abutment means operatively connected between each of said slides and the head pivotally connected thereto, in which said jaws of each pair of separately pivoted to one of said heads, toggle means connecting the jaws of each pair, a ball nut and screw device connected to each toggle means, and a motor carried by each head and connected to the ball nut and screw device which is connected to the toggle means thereon.

* * * * *